United States Patent [19]
Schmickler et al.

[11] Patent Number: 5,265,094
[45] Date of Patent: Nov. 23, 1993

[54] CHANNEL ACCESSING PROCESS FOR A LOCAL TRANSMISSION NETWORK CONFIGURED AS A BUS SYSTEM

[76] Inventors: Leonhard Schmickler, Republikplatz 5, D-5100 Aachen; Klaus Scholten, Aidlingerstr. 3, D-7044 Enningen; Friedrich Schreiber, Monschau; Carmelita Gorg, Aachen, all of Fed. Rep. of Germany

[21] Appl. No.: 681,515

[22] PCT Filed: Sep. 10, 1990

[86] PCT No.: PCT/EP90/01525
§ 371 Date: May 23, 1991
§ 102(e) Date: May 23, 1991

[87] PCT Pub. No.: WO91/03897
PCT Pub. Date: Mar. 21, 1991

[30] Foreign Application Priority Data

Sep. 11, 1989 [DE] Fed. Rep. of Germany ....... 3930316

[51] Int. Cl.⁵ ............................................. H04L 12/40
[52] U.S. Cl. ................... 370/85.3; 370/85.6; 340/825.5
[58] Field of Search .................. 370/85.1, 85.2, 85.3, 370/85.4, 85.5, 85.6; 340/825.5, 825.51

[56] References Cited

U.S. PATENT DOCUMENTS

| | | | |
|---|---|---|---|
| 4,536,875 | 8/1985 | Kume et al. | 370/85.3 |
| 4,598,285 | 7/1986 | Hoshen | 370/85.2 |
| 4,623,886 | 11/1986 | Livingston | 370/85.2 |
| 4,628,311 | 12/1986 | Milling | 370/85.2 |
| 4,663,757 | 5/1987 | Huang et al. | 370/85.2 |
| 4,670,872 | 6/1987 | Cordill | 370/85.2 |
| 4,707,829 | 11/1987 | Pendse | 370/85.2 |

Primary Examiner—Douglas W. Olms
Assistant Examiner—Hassan Kizou
Attorney, Agent, or Firm—Dykema Gossett

[57] ABSTRACT

A process is disclosed whereby each of a plurality of stations, transmitting messages segmented into multiple sequential packets, is able to access a transmission channel of a local communications network. A residual packet number is associated with each message representing the number of packets remaining in the message after the instant packet has been transmitted. The number of packet collisions on the transmission channel is reduced by employing a resolution phase, which may be divided into several time intervals. Stations transmit messages with certain residual packet numbers during predetermined time intervals of the resolution phase. A station transmits its next packet after the end of the ongoing transmission if its residual packet number is smaller than the residual packet number of the ongoing message transmission.

15 Claims, 8 Drawing Sheets

CHANNEL ACCESSING PROCESS FOR A LOCAL TRANSMISSION NETWORK CONFIGURED AS A BUS SYSTEM

BACKGROUND OF THE INVENTION

The invention relates to a channel accessing process for a local transmission network, configured as a bus system for message with packet classification without central control, in which each station able to transmit monitors the transmission channel and—depending on the state of the transmission channel—transmits its message and wherein, in the case of a collision of messages, an interruption of the message transmission and a collision resolution takes place on the communications channel in a resolution phase.

With such a process for network accessing, it is a basic principle that each station able to transmit can spontaneously access the transmission channel. During this process, collisions must be avoided if possible. Each station which has a message to send, tests the communications channel as to whether it is occupied or free. If it is free, then the message is transmitted. If, during this process, a collision occurs because another participant—also having checked the communications channel and having found it to be unoccupied—is transmitting at the same time, then this collision is detected and both stations repeat their initially futile attempt, at which time—due to the activation of random generators—a random time displacement can be introduced at both participating stations. For this reason and with great probability, subsequently only one message transmission [at a time] is sent to the communications channel. For this type of message transmission, a so-called transmission protocol is always essential. The most known one is the so-called CSMA/CD process (carrier sense multiple access with collision detection).

Each station of the message transmission network must contain a control unit for its control in accordance with the prescribed transmission protocol, by means of which it is assured that all stations operate in the same way. With the initially described channel access process, in case of a great load on the communications channel due to collisions which at that time are more frequent, the efficiency of the entire system can deteriorate, [a situation] manifesting itself by a prolonged average data transfer time. With the introduction of new data transmission services with large amounts of information, such as access to distributed memories or image transmission, the load of the message transmission network becomes greater. Typically, the basic load in a data network lies below 10%; however, with steadily increasing traffic, load peaks in the range of 30 to 40% occur more and more frequently. For this reason, there exists the danger of an overload, as well as unacceptable response times for the users.

Attempts have already been made to reduce the number of collisions which necessarily occur with a process of the initially named type by developing particularly advantageous algorithms for the collision resolution.

Also, in order to shorten the data transfer time during the data transmission in packet transmission networks, priorities were raised for discussion, wherein the packets in each packet switching device are sorted according to length and the transmission of short packets is preferred. For this purpose, only collision-free systems with central control are taken into consideration and no substantial improvements are achieved because the packet lengths scatter only relatively weakly.

SUMMARY OF THE INVENTION

The invention is based on the consideration that steps for collision resolution alone cannot substantially contribute to a decisive improvement of the average transfer time as long as no provisions are made to keep the number of collisions to be resolved at a minimum. However, this can take place only through an optimization of the channel access process itself.

Accordingly, it is the task of the invention to indicate a channel accessing process for a distributed system without central control, in which the number of possible collisions is reduced and, simultaneously, the average transfer time is shortened.

For the solution of this task, according to the invention, a process of the initially named type is structured in such a way that the message is transmitted in a sequence corresponding to the increasing residual length or residual output time and that the resolution phase, starting with the end of a collision, possibly consists of several time segments, in which the transmission of packets message of predetermined residual length or residual output time is released.

The solution for the task required is based on the observation that in most local message transmission networks, the length of the message strongly scatters (streut). By holding a long message transmission in a station when a short message is in the process of being transmitted, may only lead to collisions on the communications channel when, during the transmission of this message, an even shorter message is received by the station and should preferably—due to its brevity—be transmitted. This means that the number of possible collisions is considerably less than with the initially cited general process. By dividing the collision resolution phase into, possibly, several time segments, in which message transmissions of a predetermined residual output time can be transmitted, an automatic sorting of the collided messages takes place, so that repeated collisions are practically excluded.

In many cases in which the invention is applied it may be advantageous to sort the message present in the respective station with respect to its residual length or residual output time. This can facilitate handling in the station of the information to be transmitted.

The process in accordance with the invention is particularly advantageously structured in that in order to indicate the residual length or residual output time, the message packets are always provided with a residual packet number, indicating the amount of the total number of packets of this message still to be transmitted. Such a procedure had already been proposed in a general sense, however only for several messages pending in a station parallel to the transmission and not in the context of the above-explained process of the invention. Here, it results in particular advantages, since this type of numbering of the transmission packets of each message to be transmitted results in a particularly simple evaluation of transmitted messages during monitoring of the communications channel and for the transmission of messages waiting in the individual stations. The residual packet number is directly proportional to the residual output time of the respective message and thus its residual length.

It is possible to carry out the process in a particularly advantageous manner, so that once a transmission in progress is detected, the message present in this station is transmitted by means of a station able to transmit, provided the [latter's] residual packet number is smaller than the residual packet number of the next expected packet of the ongoing transmission. Through the use of the residual packet numbers, it is particularly simple—in a station able to transmit and monitor the communications channel—to determine the residual packet number of a message packet just transmitted from another station and to calculate from this one the subsequent one, i.e., the expected residual packet-number. If the latter is greater than the residual packet number of the message present in the monitoring station able to transmit, then this message—without regard for the next packet to be expected within the framework of the transmission in progress—is transmitted on the transmission channel, so that a collision of both message packets is provoked. Thus, time control of this process takes place in accordance with the condition that the message begins to be deposited when the ongoing transmission of a message packet is completed, since the station that is able to transmit transmits—in principle—its message only when the communications channel is free. During the intervals between message packets to be transmitted, this is always the case.

If a collision has been provoked in the described manner on the communications channel, then—with its end—the resolution phase always begins, in which the transmission authorization is at first granted to the station participating in the collision which wishes to send the packet with the smallest residual packet number.

In another arrangement of the concept of the invention, the process may be realized in such a way that the time intervals of the resolution phase are assigned to several ranges of residual packet numbers. Thus, it is not necessary to provide for each possible residual packet number its own time interval in the resolution phase, but several ranges, however few in number, suffice for the resolution of the existing collisions.

With the above-explained further development of the invention, the first time interval can only be assigned to residual packet no. 1. This is frequently advantageous when a messages-comprising only one packet is to be transmitted.

The number of time intervals of the resolution phase and/or the upper limit of the respective range of residual packet numbers may be adjusted in accordance with the traffic load of the transmission network. This means an adaptability of the resolution of collisions to the respectively existing traffic on the transmission network and an optimization of the transfer times occurring in the transmission network.

In the same way, the number of the time intervals of the resolution phase and/or the upper limit of the respective range numbers may be adjusted depending upon the residual packet numbers of the respective packet transmitted last in an uninterrupted manner. This type of adaptation of the resolution of collisions to the residual message length leads also to an optimization of the transfer times.

Similarly, it may be advantageous when the interruption of the message transmission takes place only for information with a predetermined minimum residual message length or minimum residual output time. For example, in the case of a certain traffic load of the transmission network, the decrease in transfer times possibly achievable with the invention may already suffice when applied to longer messages and—applying the invention to shorter messages—may not achieve any substantial improvement when compared to the expenditure involved.

Finally, during application of the invention, it is also of advantage if—following the successful transmission of an information packet—a channel access takes place independently of the residual length or the residual output time of this message, when the transmission channel remains unused for a predetermined amount of time. Thus, the use of the transmission channel is assured even when a station may transmit a message but does not send it due to an error.

BRIEF DESCRIPTION OF THE DRAWINGS

The invention is further explained in the following text by means of the drawing. It is shown in.

DETAILED DESCRIPTION OF THE PREFERRED EMBODIMENT

Figure 1:
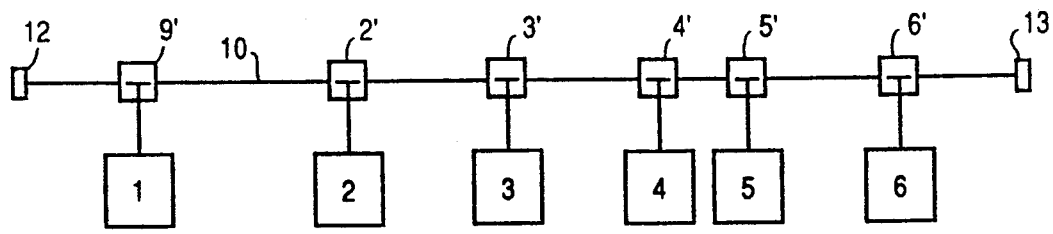
FIG. 1 The general illustration of a distributed message transmission network without central control.

In FIG. 1 a distributed message transmission network without central control is shown which has a bus structure and is used in a local distance range. A bus (10) is provided, which serves as a communications channel commonly accessible to all stations 1 through 6 and which carries out a passive message transport. This means that each transmission—without any action whatsoever on the part of the stations not concerned—reaches all its addressees and that delay times do not occur in the individual station because messages are not passed through them. The individual stations (1 to 6) are connected-to the bus (10) in each case by a sending unit (1' to 6'). For example, the bus (10) may be a multiple line system, a coaxial cable, or fiber optics. The bus (10) is closed off at its beginning and at its end with a terminating resistor (12 or 13).

Figure 2:
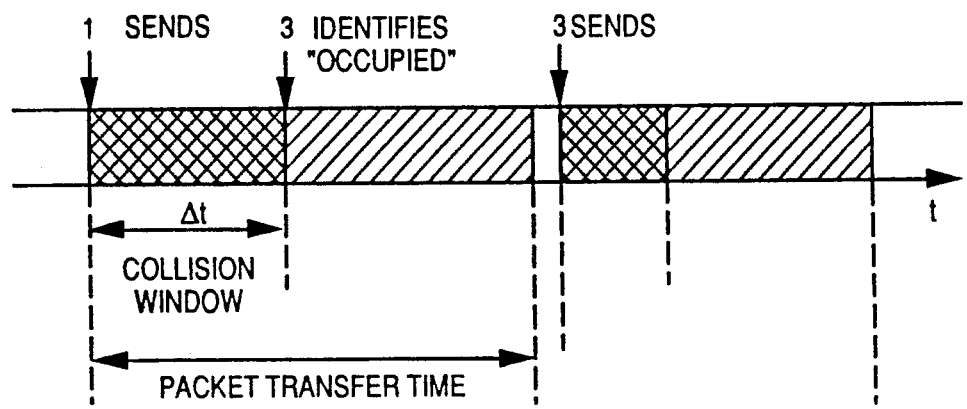
FIG. 2 a schematic diagram of a channel access in a packet message transmission network without collision.
Figure 3:
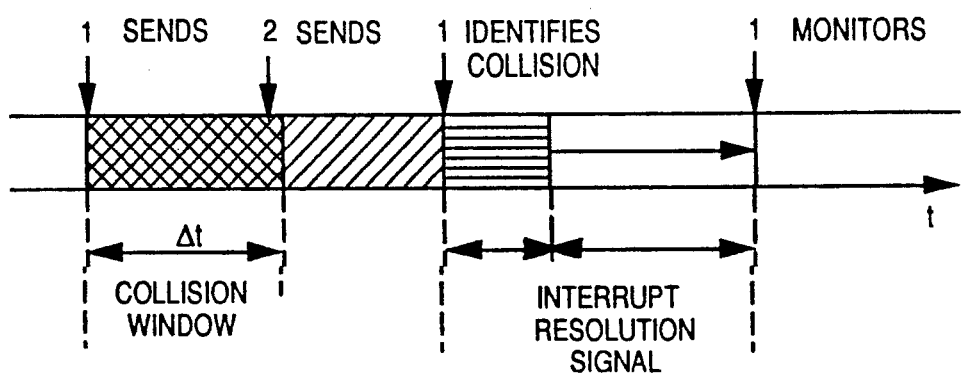
FIG. 3 a schematic diagram similar to FIG. 2, however with a collision process.

For a better understanding, at first by means of FIGS. 2 and 3, the channel access without and with collision is explained in accordance with the known CSMA/CD protocol.

In FIG. 2, schematically and depending on the time (t), a channel access through station (3) is shown as it is carried out in accordance with the known technology. In the case shown in FIG. 2, no collision occurs. The signal of the station (1) reaches the station (3) before the latter has a sending request. As soon as such a one occurs, the station (3) recognizes the in-use status of the bus (10), so that it does not transmit the message it contains. A collision window Δt is also shown which is shorter the packet transmission time. This corresponds to the delay time of the signal of station 1 to station 3 in which the latter still recognizes the bus (10) as free although station (1) is already sending. If, during this time, station (3) were to transmit the message it has, then a collision would occur and be recognized by the station (1). However, this is anticipated in the case shown in FIG. 2, since station (3) starts its monitoring at a later point in time than the collision window Δt. It identifies the in-use status of the bus (10) and—for this reason—sends the message present in it only after the packet transmission time.

In FIG. 3, a channel access is shown in which a collision takes place. Station (1) is in sending status and monitors the bus (10). Station (2) sends within the collision window Δt, because already at this point in time, it is ready to send and monitors the bus (10), however, it does not yet receive the message of station (1). Station (1) identifies the collision later when the message of station (2) arrives and, subsequently it sends an interrupt signal, by means of which all stations which are connected to the bus (10) are informed that a collision is occurring so that they can no longer access the bus (10). The resolution of this collision takes place in a resolution phase subsequent to the interrupt signal according to one of the known resolution algorithms. Subsequently, it is shown as an example that the station (1) again monitors the bus in order to test it as to whether it is in the in-use or the free status.

In a CSMA/CD-system, each station can normally start its transmission after the end of a transmission and a predetermined packet distance, inasmuch as it determines the free status of the bus. During that time, as mentioned before, especially during great network load, many collisions can occur, which substantially reduce the effectiveness of the system because the transfer times on the average are significantly increased.

Figure 4:
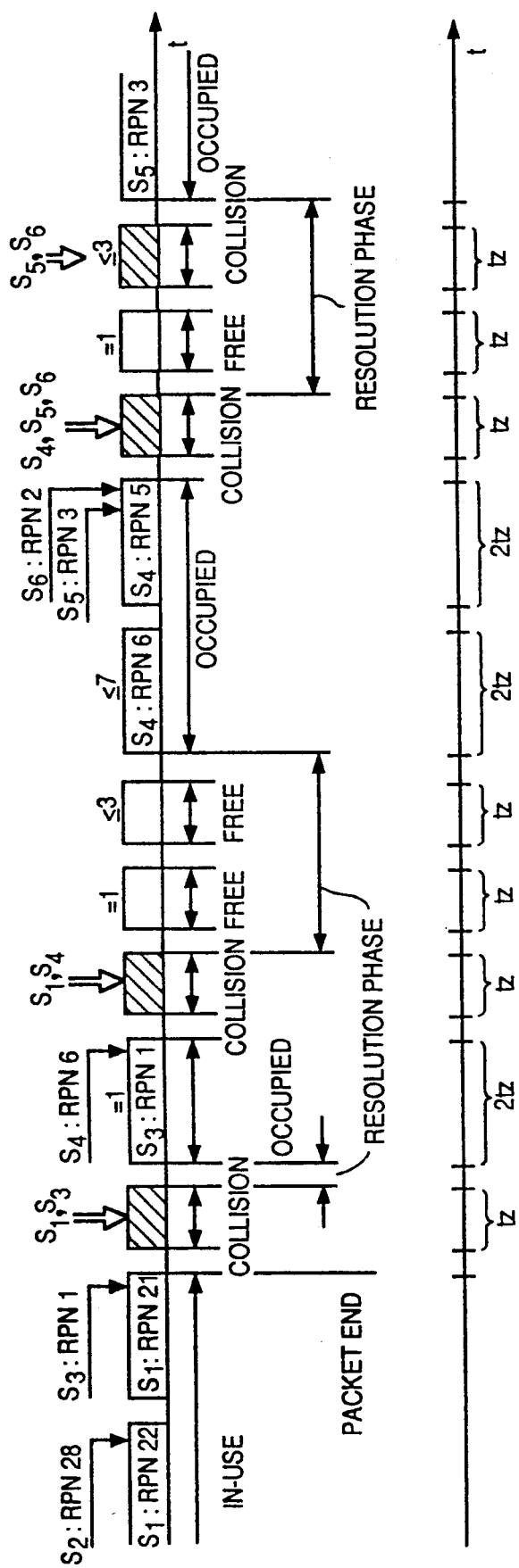
FIG. 4 the schematic diagram of several collision processes in a process in accordance with the invention.

While referring to FIG. 4, the example of an application of the invention in a system of this type is explained. For this purpose it should be presumed that in each message packet a residual packet number is entered which is proportional to the length of the message segments not yet sent. The determination of the residual packet number of a packet transmitted from a station makes it possible for each of the other stations to decide whether it may or may not provoke a collision. If the residual packet number in a given station is greater or equal to the next residual packet number to be expected from the station sending at the moment, wherein the next residual packet number can be calculated by each station able to transmit, then access to the bus does not take place. The sending station can thus transmit its next packet. In this way, collisions are avoided. However, if the residual packet number in the station able to transmit is smaller than the next residual packet number to be expected from the sending station, then the station able to transmit starts its transmission after the predetermined packet distance and a collision takes place. During a resolution phase beginning with this provoked collision, time segments for the start of the transmission of packets with respectively predetermined ranges of residual packet numbers are reserved. If in one of the time segments several stations can start the transmission, then a resolution algorithm for the resolution of occurring collisions can be used.

In the following, these processes are explained by means of an example. The arrows shown in FIG. 4, which are directed downwardly, mark the arrival of new message with a residual packet number RPN at a station $S_n$. The double arrows mark a transmission attempt of more than one station in one and the same time-slot tz. The time slots tz or 2tz are produced in each station $S_n$ by means of a time generator, which is initialized following each successful transmission and each collision. Since all stations $S_n$ monitor the bus, all time generators are started simultaneously.

FIG. 4 shows at the beginning of the time-related illustration that during the transmission of a packet with RPN=22 from station $S_1$ a message with RPN=28 arrives at station $S_2$ to be transmitted. Station $S_2$ detects RPN=22 on the bus and gets no channel access after the packet distance,, since its RPN=28 is greater than RPN=21, which is to be expected next from station $S_1$. A collision is avoided. While station $S_1$ transmits packet RPN=21, a message arrives at station $S_3$ which consists of a single packet and for this reason has RPN=1. For this reason, station $S_3$ provokes a collision following the end of the ongoing transmission of the packet with RPN=21 of station $S_1$. Thus, two packets collide with RPN=20 from station $S_1$ and RPN=1 from station $S_3$.

Upon detection of this collision, all stations of the system store RPN=20 as the next packet to be expected by the station $S_1$. The collision effects the start of a resolution phase, which starts with a time segment, which is reserved for packets with RPN=1. Thus, in this example, the station $S_3$ starts the transmission of its message consisting of a single packet.

During the transmission from station $S_3$, a message to be transmitted arrives in station $S_4$ with RPN=6. After determining the packet end with RPN=1, only stations in which a message with RPN≦20 is present have access to the bus. This status is perceived by stations $S_1$ and $S_4$ and again a collision occurs.

Now, the first two time segments of the thus caused resolution phase are unoccupied since no message with RPN=1 or RPN≦3 is present. In the third time slot after the collision, the station $S_4$ successfully starts the transmission of a packet with RPN=6.

Subsequently, while station $S_4$ sends its packet with RPN=5, two short messages with RPN=3 and RPN=2 arrive in stations $S_5$ and $S_6$. After the packet with RPN=5, a collision occurs between stations $S_4$, $S_5$, and $S_6$. After the first unoccupied time segment of the subsequent resolution phase, the messages of stations $S_5$ and $S_6$ again collides because their RPN≦3. These stations utilize a resolution algorithm and the station $S_5$ transmits the packet with RPN=3. All stations in the network have stored the residual packet numbers of the last collision during the resolution phase. They observe the activity on the bus and compare the stored residual packet numbers with the residual packet numbers of the message which are waiting in them for transmission and they accordingly decide whether a transmission should be started.

Figure 5:
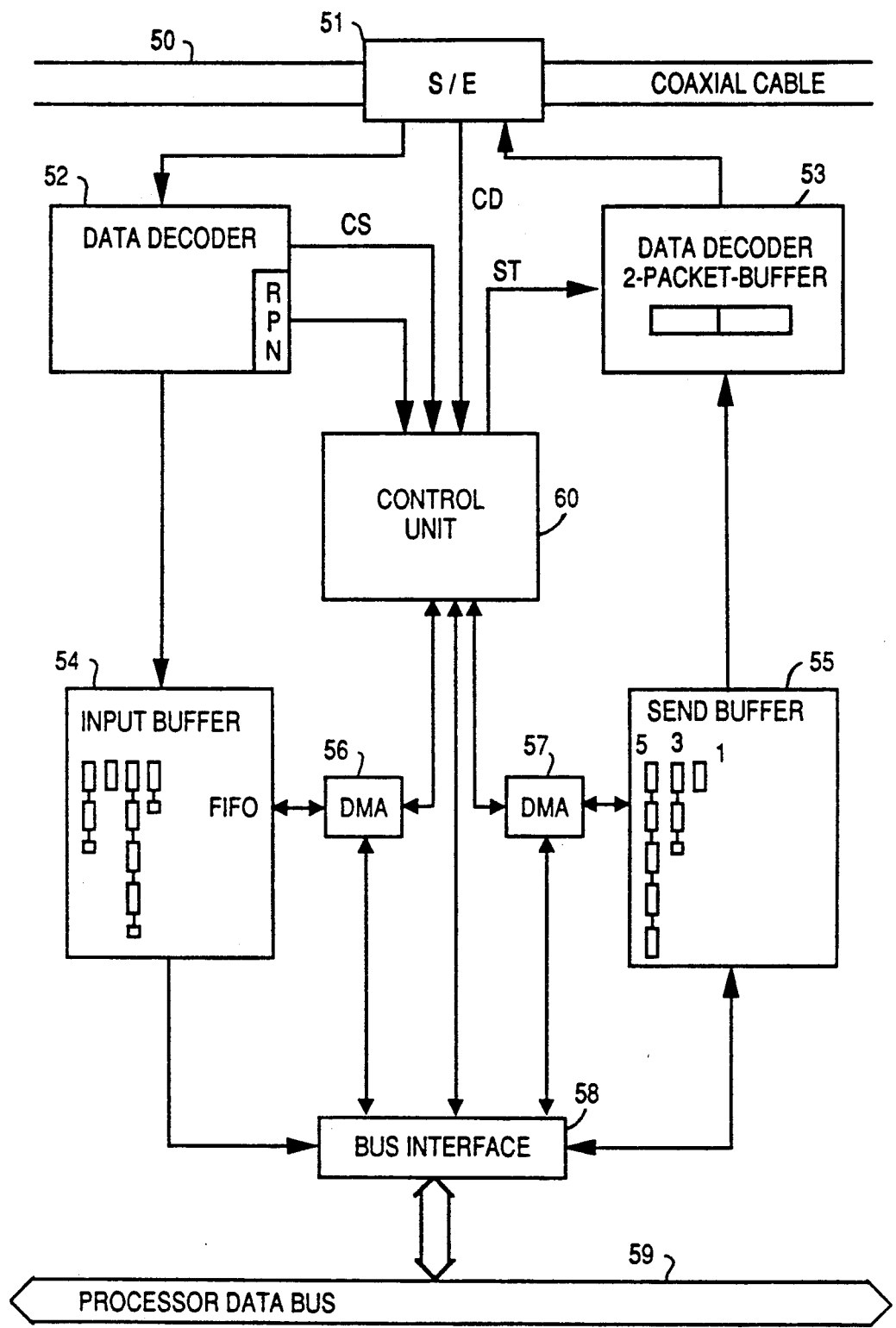
FIG. 5 a block diagram of the control unit of a stations operating in accordance with the process of the invention.

FIG. 5 shows the most important parts of the control of each station connected to a bus (50). Among them are a transceiver (51), a data decoder (52), a data encoder (53), an input buffer memory (54), an send buffer memory (55), memory access circuits (56 and 57), as well as an interface (58) by which the station observed here is connected to a processor-data bus (59 Furthermore, signal paths are shown by which the above-named units are connected amongst each other and mutually interact. Here, the most important component is a control unit (60), the structure of which is still further explained in the following.

At first it is shown how the functional units shown in FIG. 5 mutually interact with each other when a channel access is carried out in accordance with the process of the invention.

When, in the station shown in FIG. 5, a message is present for transmission, it is then divided into individual packets in a known manner not shown here, wherein the packets are written into the send buffer (55), by the memory access circuit (57) from the control unit (60), as a linked list. Each packet has a residual packet number RPN which, for example, is entered in its header. Longer packet chains have in their first packet a larger residual packet number, shorter packet chains have smaller residual packet numbers. In the respective first packets of the packet chains shown, for example, in the send buffer (55) in FIG. 5, the residual packet numbers 5, 3, and 1 are found. The time necessary for the administration and sorting of the send buffer (55) should not influence the sending function of the station. In order to insure this, the principle explained below is used.

If the computer connected by the computer data bus (59) signals to the control unit (60) that an additional message is to be transmitted, then the control unit (60) reads this message from the memory of the computer and carries it into the send buffer (55) at the place which corresponds to its length. If several messages have the same length, the time sequence makes the decision. The first two packets of the send buffer (55) are loaded into the data encoder (53). These are the two packets with the lowest residual packet number, i.e. here with the residual packet number 1 and 3. For this purpose, the data encoder (53) is organized in such a way that the first of these two packets, i.e. the packet with the residual packet number 1, no longer can be displaced by another packet. This is sensible in that it permits immediate access to the channel becoming free at any point in time. Only when the first packet in the message encoder (53) is not already located in the transmission phase, the second packet present there can be displaced by those messages newly entering the send buffer (55), in which these message must have a smaller residual packet number than the transmission already stored in the send buffer (55). In this way, it is possible to carry out administrative operations in the control unit shown in FIG. 5 without leaving the possibly free bus (50) unused. Successfully transmitted message packets are removed from the send buffer (55).

The message decoder (52) must evaluate a message packet respectively received via the bus (50). If in its target address field the own address is detected (read), then the respectively received message packet is written into the input buffer (54). This process takes place by the message decoder (52), which—in addition to this function—also evaluates the residual packet number of each received packet and sends it on to the control unit (60).

Furthermore, the message decoder (52) transmits a flag (CS) to the control unit (60). This concerns the tracking of a message packet (carrier sense). From the send unit (51), a flag (CD) is transmitted to the control unit (60), which flag identifies the condition of message collision (collision detection), which has already been detected in the sending-unit (51).

The message decoder (52) also informs the control unit (60) at any point in time regarding the activities of other stations taking place on the bus (50).

The input buffer (54) is connected by the memory access circuit (56) with the control unit (60). Furthermore, it is connected by an interface (58) with the computer data bus (59), so that the messages stored in it are read by the control unit (60) and can be transmitted to the linked computer by the interface (58) and the data bus (59). The computer can then evaluate them with respect to their control and information content.

Figure 6:
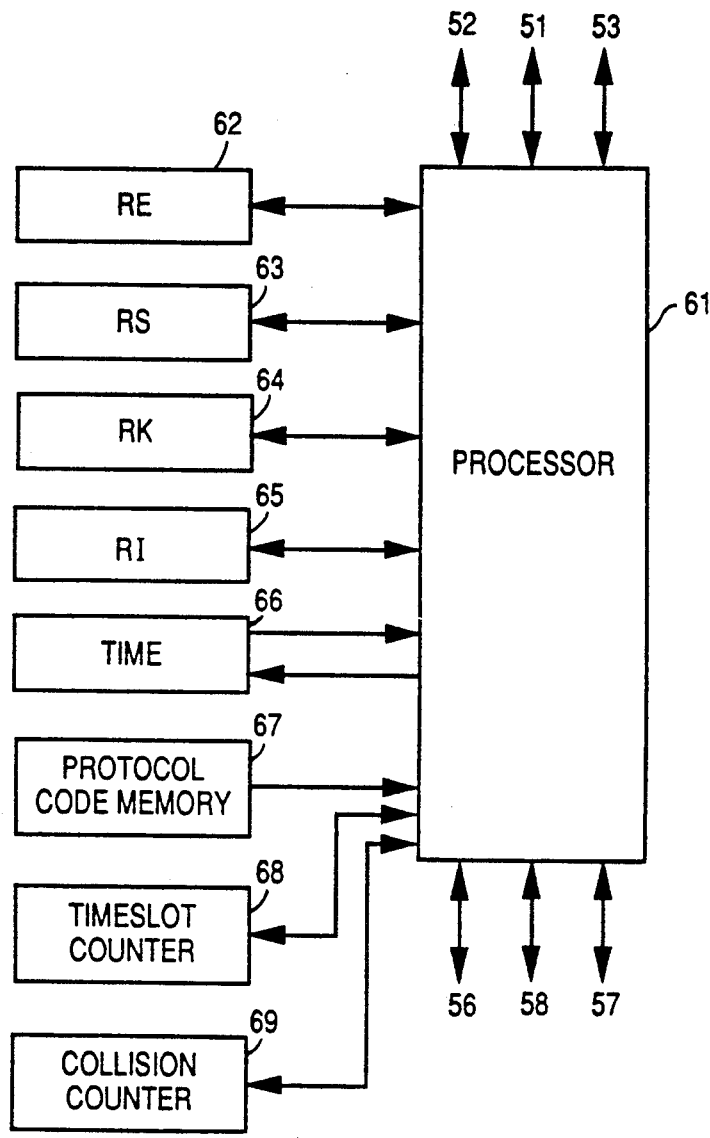
FIG. 6 an overview of the most important components of a control device in the control unit shown in FIG. 5.

In FIG. 6, an overview of the most important components of the control (60) is shown which is part of the control unit shown in FIG. 5. This control unit (60) consists essentially of a processor (61), an input register (62), an send register (63), a collision register (64), an interval upper limit register (65), a time generator (66), a protocol-code memory (67), a time slot counter (68) and a collision counter (69). The processor (61) is connected with the units (51 to 53) and (56 to 58) shown in FIG. 5 and controls the entire process flow of access to the bus (50). Control variables for this process flow are received by the processor (61) from the units (62 to 69). The information to be stored in registers (62) through (65) is directed by the processor (61). Furthermore, the time generator (66) is set by the processor (61). The protocol-code memory (67) may, for example, contain the CSMA/CD-protocol for access to the bus (50).

The input register (62) stores the residual packet number of the last message packet successfully transmitted from any station of the message transmission network to the bus (50). The initial value of the input register (62) is RE=1, for the successful transmission of a message always ends with a message packet with RPN=1 and then the initial state of the system is reached (again). The send register (63) stores the residual packet number of the first message packet which is contained in the message encoder (53). The initial value of this register is RS=0. The collision register (64) stores the residual packet number, reduced by 1, of the last successfully transmitted message packet when a collision occurs, or the value of the interval upper limit register (65) when a collision occurs during a resolution phase. Its initial value is RK=0. The interval upper limit register (65) stores for each actual time segment of a resolution phase the respective maximum residual packet number which in this time segment is permitted access to the bus (50). After a collision has been provoked on the bus (50), successively are thus loaded into the interval upper limits register (65) the upper limits of the time segments of the resolution phase which are given for residual packet numbers accessing in the respective time segment on the bus (50).

When the respectively observed station is turned on, the registers (62 to 65) are loaded with their initial value. Furthermore, this initial value always appears when in the entire message transmission network no message is awaiting transmission.

Since all stations of the message transmission network monitor at any point in time the bus (50), the contents of all registers (62 to 65) with the exception of the send register (63) are identical in each station. The time generator (66) is initialized-after each successful transmission and after each collision. From the status of the time generator (66) and the contents of the registers (62 to 65), the control unit recognizes whether it should start a message transmission for its station or not. The time generator (66) produces time slots, the duration of which may be standardized for a message transmission network and may amount to 51.2 μs, for example.

With the channel access process described here as an example, the serial-transmission of packets of a message from one station is not interrupted by a transmission attempt of another station able to transmit with the transmission packet number RS stored in the send register (63), when RS is stored with respect to the residual packet number RE of the packet last monitored on the bus (50), which is stored in the respective input register (62), fulfills the condition $$RS \geq RE - 1 \text{ or } RE \leq 3.$$

Thus, messages requiring only 3 or less packets for transmission are not interrupted. However, when the message packet present in the message encoder (53) of a station able to transmit fulfills the conditions $$RS < RE - 1 \text{ and } RE > 3,$$

then the transmission of this message packet is started as soon as the transmission of the packet just transmitted to the bus (50) is completed. Thereby a collision is provoked and the described resolution phase begins in which the transmission right to the station participating in the collision is assigned, in which the message packet with the lowest residual packet number is waiting for transmission.

The transmission of a message from a station connected to a message transmission network is brought about when a send authorization, based on the process of the invention, exists. For this send authorization (Sendeberechtigung), one of the following conditions must be met:

1. The last successfully transmitted message packet comes from the station able to transmit.
2. The residual packet number to be transmitted is smaller than the next residual packet number to be expected on the bus; a collision is provoked.
   This means: $RS < RE - 1$ and $RE > 3$
3. A transmission is concluded and no other message coming from a collision is known.
   This means: $RE = 1$ and $RK = 0$ (initial values)
4. A transmission is concluded and the residual packet number, waiting for transmittance in the station able to transmit, is smaller or equal to the residual packet number of a message known from a collision; a collision is provoked.
   This means: $RE = 1$ and $RS \leq RK$
5. Despite $RE > 1$, the communications channel is still unoccupied even after several time slots. This condition relates to erroneous behavior of a station authorized to transmit but which is not transmitting. This condition is to prevent the possibility of the transmission channel not being used by any station.

As upper limit ranges of residual packet numbers for four time segments of a resolution phase, for example, the following values have proven to be advantageous:

$$B_1 = 1, B_2 = 3, B_3 = 7, B_4 = RK - 1$$

In this case the maximum collision number is 15.

By means of FIGS. 7 to 10, in the following the flow chart of the functions inside the processor (61) is explained for the channel accessing process.

Figure 7:
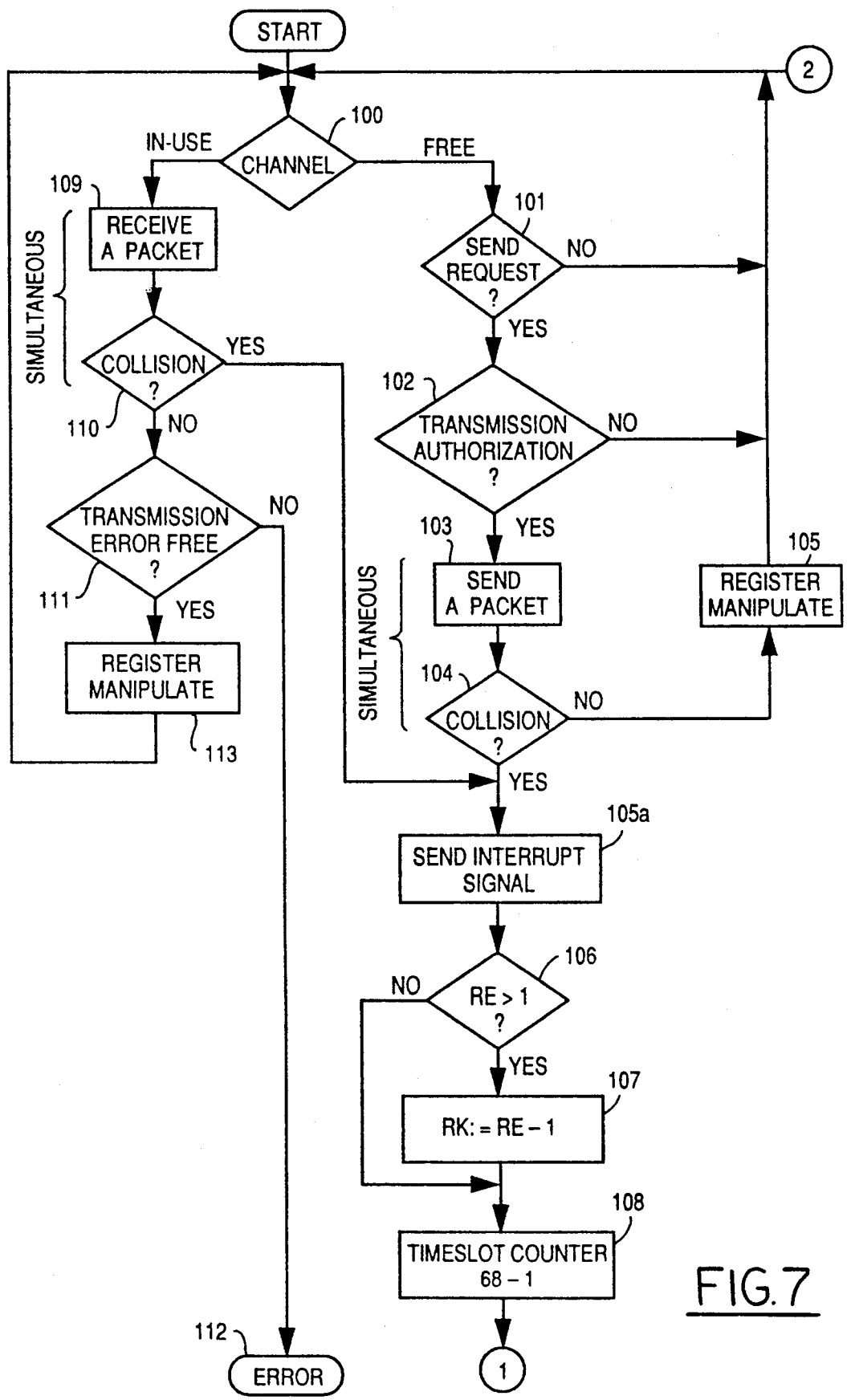
FIGS. 7, 8, 9 and 10 the flow diagram of a function sequence in a station operating in accordance with the channel accessing process of the invention, and FIG. 11 a graphic representation explaining the shortening of the average transfer times obtainable with the invention.

In FIG. 7, a primary segment of a channel access is illustrated, the procedural course of which is carried out with the control unit shown in FIGS. 5 and 6 when a station able to transmit monitors the transmission channel. After the procedural flow has started, it is tested in a primary step (100) whether the communications channel is free or occupied. If it is free, a test is conducted in step (101) as to whether in the station observed here an send request is present. If this is not the case, then the control is returned to step (100) and the loop is again run with the steps (100 and 101). As soon as a send request is detected in step (101), a test of the send authorization takes place in step (102). If one of the above-named five conditions for the send authorization exists, then in step (103), the transmission of a message packet is prompted. Through simultaneous monitoring of the transmission channel, a test is conducted in step (104) as to whether a collision has occurred on the communications channel. If this is not the case, following the successful transmission in step (105), the register contents RE and RK (FIG. 6) are manipulated in the manner shown in FIG. 10, i.e., they are adjusted to the status changed by the message packet transmitted in step (103). Subsequently, the above-described routine is again carried out, starting with the step (100).

The step (100) is also resumed when it is determined in step (102) that a send authorization is not present.

If a collision has been detected in step (104), then the transmission of an interrupt signal is brought about in step (105a) by the station observed here. In this way, all stations connected with the transmission channel are informed about the status of the collision on the transmission channel and additional accesses on these are suppressed. Subsequently, in step (106) it is tested whether a residual packet number of a message packet received by the communications channel is contained in the input register (62) (FIG. 6), the initial state of which has the value 1. If this is the case, then in step (107) the collision register (64) is placed on the content $RK = RE - 1$, i.e., it is reduced by 1 with respect to the content RE of the input register (62). Thus, the residual packet number, reduced by 1, of the last successfully transmitted message packet is stored because a collision has been detected in step (104). For the resolution of the collision, in step (108), the time slot counter (68) is set on 1 and the control is subsequently directed to the additional steps shown in FIG. 8.

If it was detected in step (106) that the contents RE of the input register (62) contains the residual packet number 1, then a direct transition to step (108) is undertaken and the collision resolution still to be described is induced.

If it is determined in step (100) that the communications channel is occupied, then in step (109) the receipt of a message packet of another station causing the occupied status is induced and a test is conducted in step (110) as to whether a collision is present, i.e., whether the received message packet is participating in a collision. If this is the case, then an immediate transition to step (105) takes place and the interrupt signal is sent, whereupon the described steps (106 to 108) follow. If no collision is present, then, following the transmission, a test is conducted in step (111) to determine whether the transmission of the received message packet was error-free. If an error is present, then this is signaled in step (112). Otherwise, in step (113) a manipulation of the register contents RE and RK is induced (FIG. 10), whereupon the control returns to step (100) and the previously described processes are started anew.

Figure 8:
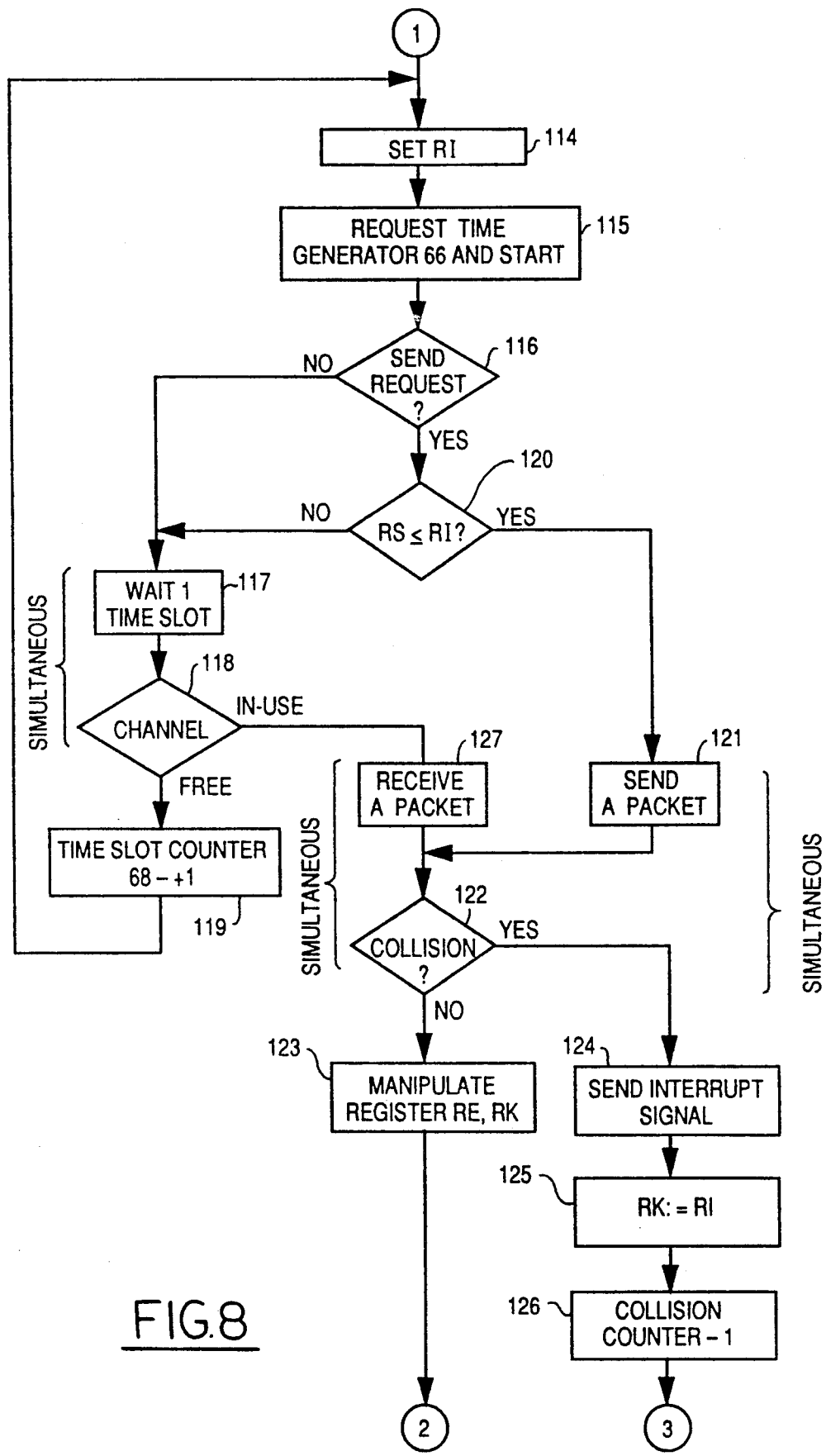

In FIG. 8, the continuation of the routine started with the steps (105 to 108) is demonstrated. Following step (108), the interval upper limit register (65) is set in step (114) to the upper limit, which corresponds to the time interval of the resolution phase set in step (108) with the time generator (66). Subsequently, in step (115), the time generator (66) is initialized and started. Following this, in step (116), a renewed test is undertaken to determine whether an send request is present. If this is not the case, then, in step (117), a waiting period is provided in order to sequence the transmission of a message packet with respect to time in such a way, that the mutual packet distance is maintained on the communications channel. In step (118) it is tested whether the communication channel is free or occupied during the time slot. If it is free, then, in step (119), the time slot counter (68) is switched to a subsequent time segment of the resolution phase and the previously described routine is started anew with step (114).

If an send request is detected in step (116), then a test is conducted in step (120) as to whether the send register (63) of the station in consideration here has a content RS which is smaller than or equal to the content RI of the interval upper limit register (65). Here, it is thus tested whether in the send register (63) the residual packet number of a message packet is contained, which may be transmitted in the time segment defined by the interval upper limit stored in the interval upper limit register (65). If this is not the case, then a transition is made to the described steps (117 to 119). If such a message packet is present, then its sending is induced in step (121). During sending, a test is conducted in step (122) to determine whether a collision is present on the transmission channel. If this is not the case, then a manipulation of the register contents RE and RK is induced in step (123) (FIG. 10) and subsequently the control is returned to step (100) (FIG. 7).

If a collision is detected in step (122), then an interrupt signal is sent in step (124) and in step (125) the content RK of the collision register (64) of the station observed here is set to the content RI of the interval upper limit register (65). Furthermore, in step (126), the collision counter (69) is set to 1 and then a transition is made to the procedural course further illustrated in FIG. 9.

If in step (118) the transmission channel has been found to be occupied, then in step (127) the receipt of a message packet is induced on the transmission channel and in step (122), it is simultaneously tested whether a collision is occurring. This is followed by the steps (123 or 124 to 126).

Figure 9:
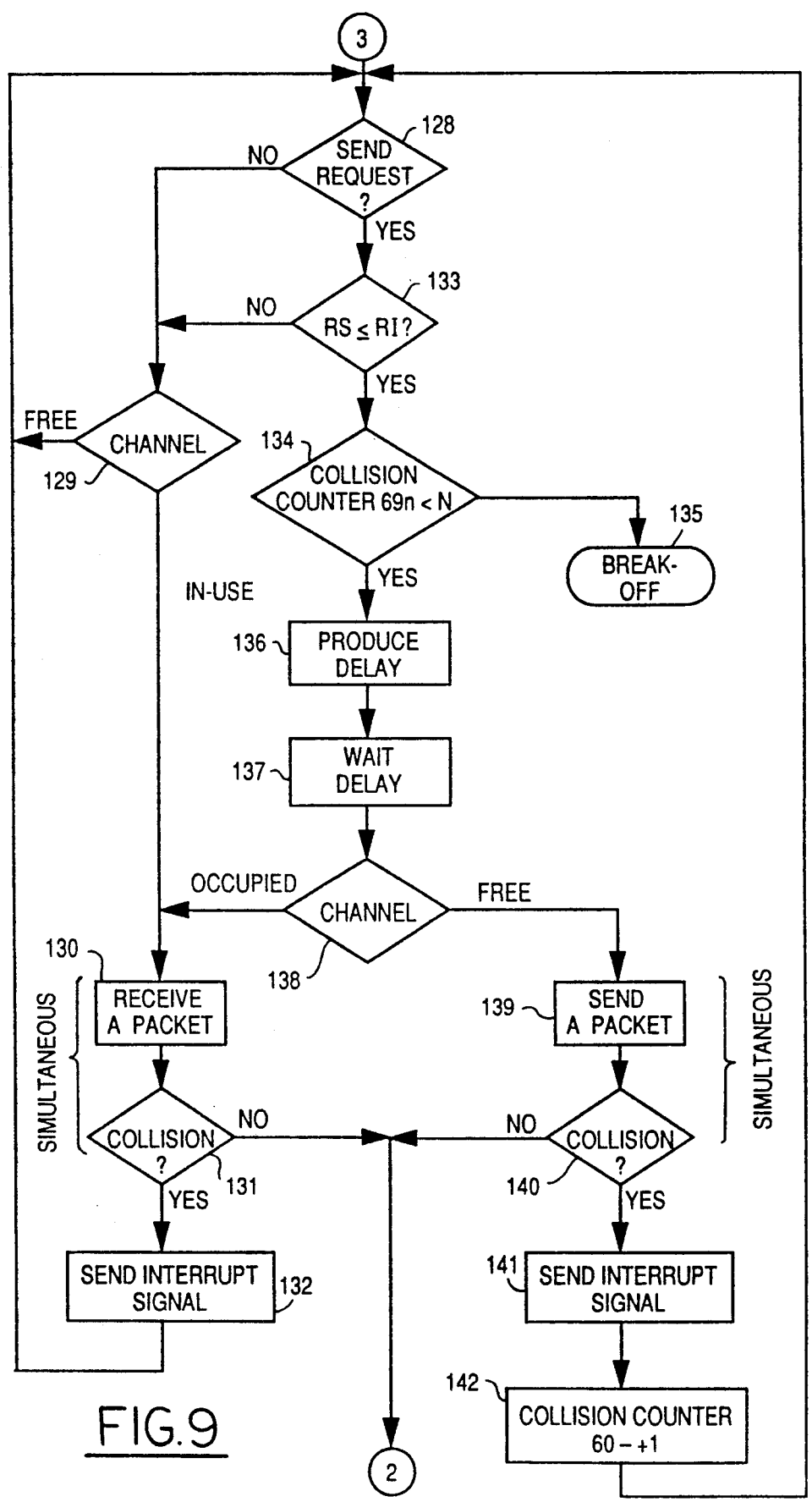

In FIG. 9, the procedural course is illustrated which follows step (126), in which the collision counter (69) is set to 1. Subsequently, a test is conducted in step (128) as to whether in the station observed here a send request is present. If no send request is present, then a test is conducted in step (129) as to whether the transmission channel is free or occupied. If it is free, then the control is returned to step (128) and the latter is run again. If the transmission channel is occupied, then the receipt of a message packet is induced in step (130) and it is simultaneously tested in step (131) whether a collision is taking place during sending. If this is the case, then in step (132) the sending of an interrupt signal is induced and the control is returned to step (128), where a check is again conducted to determine whether an send request is present.

If in step (128) an send request is detected, then a test is conducted in step (133) as to whether the contents RS of the send register (63) is smaller than the contents RK of the collision register (64). if this is not the case, then a transition is made to step (129) and the transmission channel is tested as to whether it is free or in the occupied state. If the contents RS are smaller than the contents RK, then a test is conducted in step (134) as to whether the collision counter contents (n) is smaller than the highest possible predetermined collision number N. When this number (N) is reached, then the access process is broken off in step (135). If the content of the collision counter (69) is smaller than the highest possible predetermined collision number (N), then a delay time is produced in step (136) with a random generator in which the collisions which have occurred can be resolved in accordance with a resolution algorithm and wherein in step (137) the waiting of this delay time is induced. Subsequently, in step (138) a test is Again conducted to determine whether the transmission channel is occupied or free. If it is occupied, then this corresponds to the occupied status possibly detected in step (129), so that then the steps (130 to 132) can be carried out. If it is free, then in step (139) the sending of a message packet from the station observed here is induced. In step (140), a test is simultaneously carried out as to whether on the transmission channel a collision has occurred. If this is not the case during the transmission, then this corresponds to the same result from step (131) and the control is returned to step (100) (FIG. 7). If a collision has occurred, then the interrupt signal is induced in step (141) and in step (142) the contents of the collision counter (69) is increased by 1. Subsequently, the control is returned to step (128) in order to test the presence of an send request.

Figure 10:
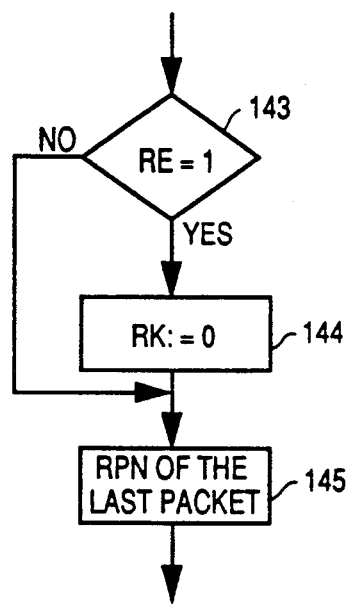

In FIG. 10, the function of the manipulation of the register contents RE and RK is demonstrated. The manipulation of these two registers consists in that at first in a step (143) a test is conducted to determine whether the content RE of the input register (62) corresponds to the latter's initial state, i.e., whether this content is 1. If this is the case, then, in step (144), the contents RK of the collision register (64) is set to 0 and subsequently in step (145) the contents RE of the input register (62) is set to the residual packet number of the message packet just successfully received by the transmission channel.

If in step (143) it had been determined that the input register (62) is not in its initial state, then the direct transition to step (145) is made in which the contents of the input register (62) is brought to the respectively current state.

Figure 11:
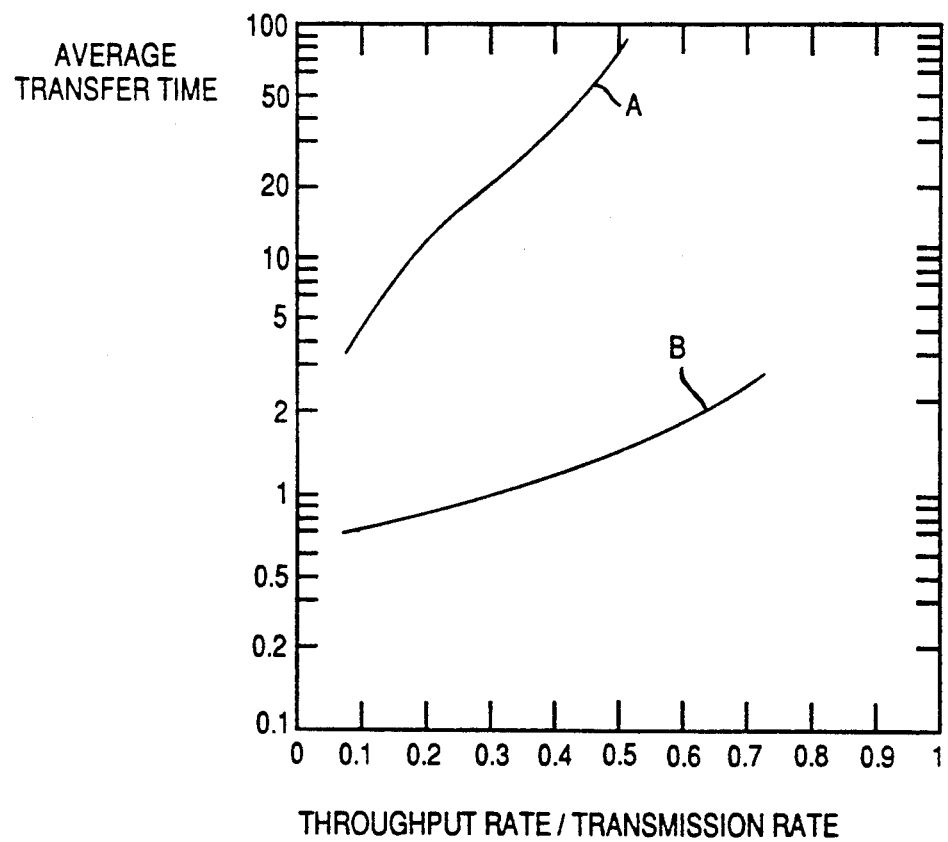

In FIG. 11, a graphic comparison of the average transfer times for a typical message mixture is shown in order to clarify the shortening effect which can be achieved with the invention. The average transfer times are shown as dependent on the traffic load of the transmission channel, i.e. on the throughput rate/transmission rate. The upper curve A results during the use of the CSMA/CD-Standard protocol. It can be seen that during a variation of the traffic load from 0.1 to 0.5, average transfer times of approximately 5 to 80 ms occur. However, if the channel accesses are carried out with the procedural steps of the invention, then this results in the indicated range in accordance with curve B in substantially reduced average transfer times of approximately 0.8 to 1.8 ms.

We claim:

1. A method for accessing a transmission channel of a local communications network by each of a plurality of stations connected to said transmission channel, said stations being configured in a bus system without central control and transmitting messages segmented into a plurality of sequential packets, comprising the steps of:

(A) associating a residual packet number with each message, said residual packet number representing the number of packets remaining in said message after the instant packet is transmitted, said residual packet number being indicated in every packet transmitted from the message;

(B) transmitting in response to an idle state on said transmission channel, a packet from a first message from a first station;

(C) interrupting the transmission of packets remaining in said first message if a collision with a packet from a second message transmitted from a second station occurs on said transmission channel;

(D) determining which packet involved in said collision of step (C) has the highest residual packet number; and (E) retransmitting said packet determined in step (D) to have the highest residual packet number.

2. The method of claim 1, further comprising the steps of:

(F) segmenting time, starting with the end of said collision of step (C), into a plurality of segments;

(G) associating at least one predetermined residual packet number with each of said time segments of step (F); and (H) retransmitting said first and said second packets of step (C) in said predetermined time segment of step (G).

3. The method of claim 1, further comprising the step of:

(I) selecting from multiple messages present in each of said stations, the message with the lowest residual packet number for transmission from each of said stations.

4. The method of claim 1, wherein step (A) further comprises:

(J) reducing by one of the residual packet number associated with each message at every successful transmission of a packet from the message.

5. The method of claim 4, further comprising the step of:

(K) transmitting upon detection of an ongoing transmission on said transmission channel, a packet from each station with a message to be transmitted, if the residual packet number of said message is at least equal to the residual packet number of the next expected packet of said ongoing transmission.

6. The method of claim 5, wherein transmission of said packet begins after said ongoing transmission has ended.

7. The method of claim 2, wherein each of said plurality of time segments is assigned to a range of residual packet numbers.

8. The method of claim 7, wherein the first said time segment is assigned to a residual packet number of 1.

9. The method of claim 2, wherein the number of said time segments in step (F) is set in accordance with the traffic load of said transmission channel.

10. The method of claim 2, wherein a range of residual packet numbers is associated with each time segment, the upper limit of said range being set in accordance with the traffic load of said transmission channel.

11. The method of claim 2, wherein the number of said time segments in step (G) is adjusted in accordance with the residual packet number of the last packet transmitted and not involved in a collision.

12. The method of claim 10, wherein said upper limit of said range of residual packet numbers in step (G) is adjusted in accordance with the residual packet number of the last packet transmitted and not involved in a collision.

13. The method of claim 1, wherein the interruption of step (C) takes place only for messages having a predetermined minimum residual packet number.

14. The method of claim 1, wherein the interruption of step (C) takes place only for messages having a residual packet number of 3.

15. The method of claim 1, wherein following the successful transmission of a packet, transmission of a subsequent packet takes place independently of said subsequent packet's residual packet number if said transmission channel remains unoccupied for a predetermined amount of time.

* * * * *